United States Patent [19]

Hattori et al.

[11] Patent Number: 4,865,829

[45] Date of Patent: Sep. 12, 1989

[54] METHOD FOR PREPARING SILICA GEL PARTICLES

[75] Inventors: Eiji Hattori; Toru Tagawa; Yasuo Oguri, all of Yokohama, Japan

[73] Assignee: Mitsubishi Kasei Corp., Tokyo, Japan

[21] Appl. No.: 242,218

[22] Filed: Sep. 9, 1988

[30] Foreign Application Priority Data

Sep. 10, 1987 [JP] Japan .................................. 62-227195

[51] Int. Cl.$^4$ ........................................... C01B 33/152
[52] U.S. Cl. ..................................... 423/338; 423/335; 502/8
[58] Field of Search ....................... 423/338, 339, 335; 502/8

[56] References Cited

U.S. PATENT DOCUMENTS 4,089,932  5/1978  Morita et al. ........................ 423/338
4,255,286  3/1981  Berek et al. ......................... 423/338

FOREIGN PATENT DOCUMENTS 61-58820  3/1986  Japan .................................. 423/338

Primary Examiner—Jack Cooper
Attorney, Agent, or Firm—Oblon, Spivak, McClelland, Maier & Neustadt

[57] ABSTRACT

A method for preparing silica gel particles, which comprises suspending a mixed solution of a silicic acid ester and water in an organic liquid immiscible with the mixed solution, followed by gelation wherein said organic liquid contains an ethyl cellulose having an ethoxy group content of at least 47% by weight and being soluble in the organic liquid.

8 Claims, 1 Drawing Sheet

METHOD FOR PREPARING SILICA GEL PARTICLES

The present invention relates to a method for preparing spherical silica gel particles and silica particles which are free from agglomeration and thus have excellent dispersibility and which are of high purity. The silica gel particles and silica particles obtained by the present invention can be used as starting materials for ceramics and as fillers in various fields.

As one of their applications, silica particles are useful as a filler for plastic package of a semi-conductor element such as IC or LSI. In a highy integrated semi-conductor element, if a sealant once heated for molding shrinks during the cooling, the resulting stress adversely affects the element. In order to avoid such an adverse effect, it is common to incorporate silica having a small thermal expansion coefficient to the sealant to reduce the overall thermal expansion coefficient of the sealant. Heretofore, it has been common to use silica particles obtained by pulverizing quartz, followed by classification. However, when the degree of integration is high, it is likely that the memory is destroyed by the radiation from the sealant, particularly from the silica particles, thus leading to a problem of erroneous operation. Therefore, it is desired to have a filler containing little radioactive impurities such as uranium or thorium. Quartz of high quality tend to be hardly available, while the demand for high quality silica tends to increase. In order to secure the supply of the sealant of high quality, it is desired to develop a method for producing synthetic silica particles of high purity.

Heretofore, for the synthesis of silica particles of high purity, there have been a dry method wherein a silicon halide of high purity is decomposed by oxygen-hydrogen flame and a wet system as disclosed in Japanese Unexamined Patent Publication No. 176136/1983 wherein a mixed solution of a silicic acid ester and water is dispersed in a liquid immiscible with the mixed solution, followed by suspension polymerization to prepare a powdery gel, which is further sintered to obtain powdery silica.

However, the silica particles obtained by the above dry method were as fine as at most 0.1 μm in the average particle size, whereby the filling property to the sealant resin was poor, and further steps of granulation, sintering, etc. were required.

In the above-mentioned wet system, during the gelation of the suspended particles of the mixed solution of the silicic acid ester and water dispersed and suspended in a liquid, the suspended particles become viscous as the hydrolysis and polymerization reaction of the silicic acid ester proceed, whereby agglomeration of particles by adhesion takes place, and agglomerated gel particles necessarily result. The agglomerated gel particles retain the agglomerated state even when sintered, and such particles have deformed shapes, whereby the filling property to the matrix such as a resin is poor. Thus, there is a problem that such particles are not suitable as a filler.

It is an object of the present invention to obtain spherical silica gel particles which are free from agglomeration and thus have an excellent filling property and which are of high purity and to obtain spherical silica particles which are free from agglomeration and thus have an excellent filling property and which are of high purity.

The present inventors have discovered that when a mixed solution of a silicic acid ester and water is suspension-polymerized in a solvent which is immiscible with the mixed solution, if a certain specific organic polymer is present in the solvent, it is possible to prevent coalescence of suspended particles by adhesion and to obtain spherical silica gel particles free from agglomeration. The present invention has been accomplished on the basis of this discovery.

The present invention provides a method for preparing silica gel particles, which comprises suspending a mixed solution of a silicic acid ester and water in an organic liquid immiscible with the mixed solution, followed by gelation, wherein said organic liquid contains an ethyl cellulose having an ethoxy group content of at least 47% by weight and being soluble in the organic liquid.

Now, the present invention will be described in detail with reference to the preferred embodiments.

In the accompanying drawings.

Figure 1:
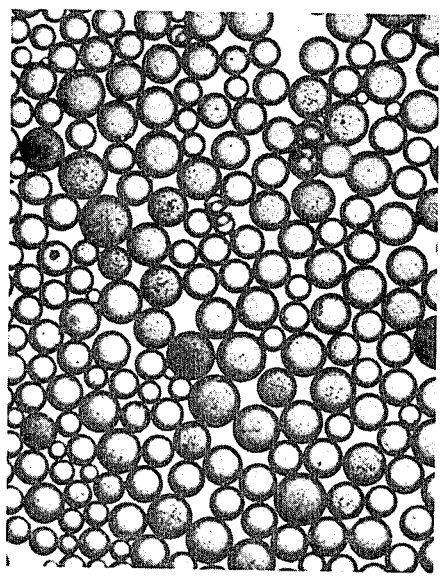
FIG. 1 is a photograph showing the structure of silica particles prepared by the present invention.

The silicic acid ester to be used in the present invention may be, as a representative compound, an alkoxy silane such as tetramethoxy silane, tetraethoxy silane, tetrapropoxy silane, or tetrabutoxy silane. It may further be an alkoxyalkyl silane such as trimethoxymethyl silane, dimethoxydimethyl silane, triethoxyethyl silane or diethoxydiethyl silane.

The ethyl cellulose to be used is selected to be substantially insoluble in water and in the silicic acid ester. In this sense, an ethyl cellulose having an ethoxy group content of at least 47% by weight is desirable. There is no particular restriction as to the upper limit of the ethoxy group content so long as the ethyl cellulose is soluble in the organic liquid as the dispersing medium. However, an ethyl cellulose having an ethoxy group content higher than 50% by weight is usually hardly available on an industrial scale. Therefore, the ethyl cellulose may be selected from those having an ethoxy group content within a range of from 47 to 50% by weight.

The organic liquid to be used as the dispersing medium may be any liquid so long as it is substantially immiscible with the mixed solution of the silicic acid ester and water and capable of dissolving the above-mentioned ethyl cellulose. However, an alicyclic compoud is usually empolyed. The organic liquid is preferably a $C_5$–$C_{10}$ alicyclic compound or an alkyl-substituted $C_5$–$C_{10}$ alicyclic compound. For example, cyclopentane, cyclohexane, cycloheptane, methyl cyclohexane, cyclooctane or decalin may be mentioned. An alicyclic compound with a carbon number exceeding the above range is not rarely suitable as a solvent for the ethyl cellulose, and the boiling point is so high that the handling will be difficult.

In the method of the present invention, firstly, the ethyl cellulose is dissolved in the above-mentioned organic liquid, and the solution is used as the dispersing medium. The ethyl cellulose is used in an amount within a range of from 0.5 to 10% by weight, preferably from 0.2 to 5% by weight, based on the total amount of the dispersing medium. If the amount of the ethyl cellulose is less than 0.05% by weight, no adequate agglomeration-preventing effect will be obtained. On the other hand, if the amout exceeds 10% by weight, it is likely that a part thereof may remain undissolved, such being inefficient.

Then, the silicic acid ester and water are mixed to prepare a starting material solution. There is no particular restriction as to the mixing ratio of the silicic acid ester and water. However, it is preferred that the amount of water is within a range of from 2 to 20 equivalents per equivalent of the silicic acid ester. If the amount of water to the silicic acid ester is less than twice in equivalent, no adequate hydrolysis and polymerization of the silicic acid ester will be obtained, whereby the yield of silica deteriorates. On the other hand, if the amount of water to the silicic acid ester exceeds 20 times in equivalent, the resulting gel is likely to have low strength, and the particles are likely to be destroyed during the process of drying or sintering. When the silicic acid ester and water are mixed in the proportion of the water to the silicic acid eater within a range of from 2 to 20 times in equivalent, they do not uniformly mix and undergo phase separation into two phases. However, by continuing the stirring of the mixture, it can be made to be a uniform solution. Namely, by the continuous stirring of the mixture, the hydrolysis of the silicic acid ester proceeds to form an alcohol, and the alcohol serves as a common solvent for the silicic acid ester and water to form a uniform solution. Thus, the mixed solution of the silicic acid ester and water becomes a uniform solution by the formation of such an alcohol. Such a uniform solution is used as the starting material solution of the present invention.

In order to facilitate the preparation of such a starting solution and the gelation of the subsequent step, a catalyst may be added. As such a catalyst, an acidic catalyst such as hydrochloric acid, nitric acid, sulfuric acid, acetic acid or oxalic acid, or a basic catalyst such as ammonia, an amine or an alkali metal hydroxide, may be used. Usually, hydrochloric acid or ammonia is most commonly used.

Then, the starting material solution prepared as described above is added under stirring to the dispersing medium in which the above-mentioned ethyl cellulose is dissolved, to form an emulsion wherein the starting material soluton is dispersed as suspended particles, followed by gelation of the suspended particles to form gel particles. Here, the volume of the dispersing medium is at a level sufficient to form an emulsion wherein the starting material solution is dispersed as suspended particles. Usually, the dispersing medium is at least in the same amount as the starting material solution.

The gelation is conducted under stirring by maintaining the temperature at a level of at least the melting point of the dispersing medium, preferably at least 30° C. and at most the boiling point of the dispersing medium. If necessary, however, the gelation reaction can be conducted at a temperature higher than the boiling point under an elevated pressure. There is no particular restriction as to the method for stirring, and an impeller-type rotary stirrer or an emulsifier for emulsion polymerization may be employed.

By the reaction under such conditions, it is possible to obtain spherical silica gel particles free from agglomeration.

The formed gel particles can readily be separated from the reaction solution by decantation or filtration and then dried to obtain silica gel particles. The silica gel particles do not agglomerate even when dried and will be obtained as spherical particles. They can be used as they are, for example, as a carrier for catalysts and as a packing materials for chromatography. However, it is usual to sinter them at a temperature of about 1,000° C. to form silica glass. When they are sintered, no agglomeration takes place, and spherical silica particles can be obtaind.

In the method of the present invention, the silicic acid ester which can readily be highly purified by e.g. distillation is used as the starting material, and silica gel particles are synthesized and then sintered to directly obtain silica particles, whereby it is unnecessary to employ a pulverization step, during which impurities are likely to enter. Thus, silica particles of high purity can readily be obtained. Yet, the obtained particles are spherical and free from agglomeration. Therefore, they may be suitably used, for example, as a highly pure filler for a sealant for IC, which ha an excellent filling property. Further, they can be used as a starting material for a high purity synthetic quartz glass for a photomask or as a quartz crucible material for the withdrawal of a single crystal.

Now, the present invention will be described in further detail with reference to Examples. However, it should be understood that the present invention is by no means restricted to such specific Examples.

EXAMPLE 1

1.4 g of an ethyl cellulose having an ethoxy group content of 49% by weight based on the total weight was added to 468 g of cyclohexane, and the mixture was heated for one hour at 50° C. to thoroughly dissolve the ethyl cellulose. The solution was put in a flask and stirred (200 rpm) by anchor-type stirring vanes in a constant temperature tank of 50° C. to obtain a dispersing medium.

Then, 25.9 g of tetramethoxy silane and 25 g of distilled water were mixed, and the mixture was stirred at room temperature for one hour to obtain a starting solution wherein the tetramethoxy silane and distilled water were uniformly dissolved.

The starting solution was added to the above-mentioned dispersing medium, and the mixture was kept in a constant temperature tank at 50° C. for two hours under stirring at 200 rpm, whereby gelation by the hydrolysis and polymerization of tetramethoxy silane were conducted to obtain a gel particle dispersion slurry. In the gel particle dispersion slurry, no agglomeration was observed, and spherical gel particles were observed.

Then, the gel particles were separated by decantation and dried at 110° C. for 24 hours to obtain silic gel partcles. The silica gel particles were spherical and free from agglomeration, and the particle size was from 50 to 200 $\mu$m.

The silica gel particles were sintered in air at 1,000° C. for one hour to obtain silica particles. The silica particles were spherical and free from agglomeration, and the particle size was from 25 to 100 $\mu$m. FIG. 1 is the photograph of the silica particles.

COMPARATIVE EXAMPLE 1

Tetramethoxy silane was geled by hydrolysis and polymerization in the same manner as in Example 1 except that 468 g of cyclohxane was used alone as the dispersing medium.

The obtained gel was amorphous irregular agglomerates, and no particles were obtained.

COMPARATIVE EXAMPLE 2

Figure 2:
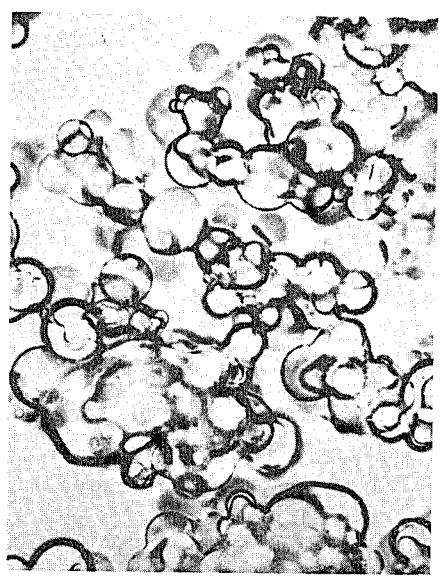
FIG. 2 is a photograph showing the structure of silica gel particles prepared by a conventional method.

Tetramethoxy silane was geled by hydrolysis and polymerization in the same manner as in example 1 except that a solution obtained by adding 5 g of a non-ionic surfactant as an emulsifier to 468 g of cyclohexane, was used as the dispersing medium, to obtain a gel particles duspersion slurry. Part of the obtained gel particles were spherical with a particle size of from 20 to 100 μm, but the majority were agglomerates formed by coalescence of a plurality of such gel particles. Even when dried and sintered, such agglomerates retained the same shapes as the gel, which is shown in FIG. 2. Even when the agglomerates were pulverized, no spherical particles were obtained.

The silica gel particles obtained by the present invention and the silica particles obtained by sintering such silica gel particles, are of high purity, free from agglomeration an spherical, and accordingly, has excellent filling properties. They can be used as a filler for an IC sealant or as a high purity ceramics materail. Thus, their industrial value is substantial.

We claim:

1. A method of for preparing spherical, unagglomerated silica gel particles, which comprises:
    suspending a mixed solution of a silicic acid ester and water in an organic liquid immiscible with the mixed solution, and gelling the resultant suspension while stirring, wherein said organic liquid contains an ethyl cellulose soluble therein having an ethoxy group content of at least 47% by weight said ethyl cellulose being present in an amount of from 0.05 to 10% by weight, based on the total amount of the organic liquid and the ethyl cellulose.

2. The method according to claim 1, wherein said silicic acid ester is an alkoxy silane or an alkoxyalkyl silane.

3. The method according to claim 1, wherein said silicic acid ester is selected from the group consisting of tetramethoxy silane, tetraethoxy silane, tetrapropoxy silane, tetrabutoxy silane, trimethoxymethyl silane, dimethoxydimethyl silane, triethoxyethyl silane and diethoxydiethyl silane.

4. The method according to claim 1, wherein said ethyl cellulose has an ethoxy group content of from 47 to 50% by weight.

5. The method according to claim 1, wherein the organic liquid is a $C_5$–$C_{10}$ alicyclic compound or an alkyl-substituted $C_5$–$C_{10}$ alicyclic compound.

6. The method according to claim 1, wherein the organic liquid is selected from the group consisting of cyclopentane, cyclohexane, cycloheptane, methylcyclohexane, cyclooctane and decalin.

7. The method according to claim 1, wherein the mixed solution contains from 2 to 20 equivalent of water per equivalent of the silicic acid ester.

8. A method for preparing a silica particles, which comprises:
    suspending a mixed solution of a silicic acid ester and water in an organic liquid immiscible with the mixed solution and gelling the resultant suspension while stirring thereby forming spherical, unagglomerated gel particles, and then
    sintering the silica gel particles to obtain the silica particles, wherein said organic liquid contains an ethyl cellulose soluble therein having an ethoxy group content of at least 47% by weight said ethyl cellulose being present in an amount from 0.05 to 10% by weight, based on the total amount of the organic liquid and the ethyl cellulose.

* * * * *